No. 889,250. PATENTED JUNE 2, 1908.
W. LOZO.
BELT STRETCHER.
APPLICATION FILED OCT. 14, 1907.
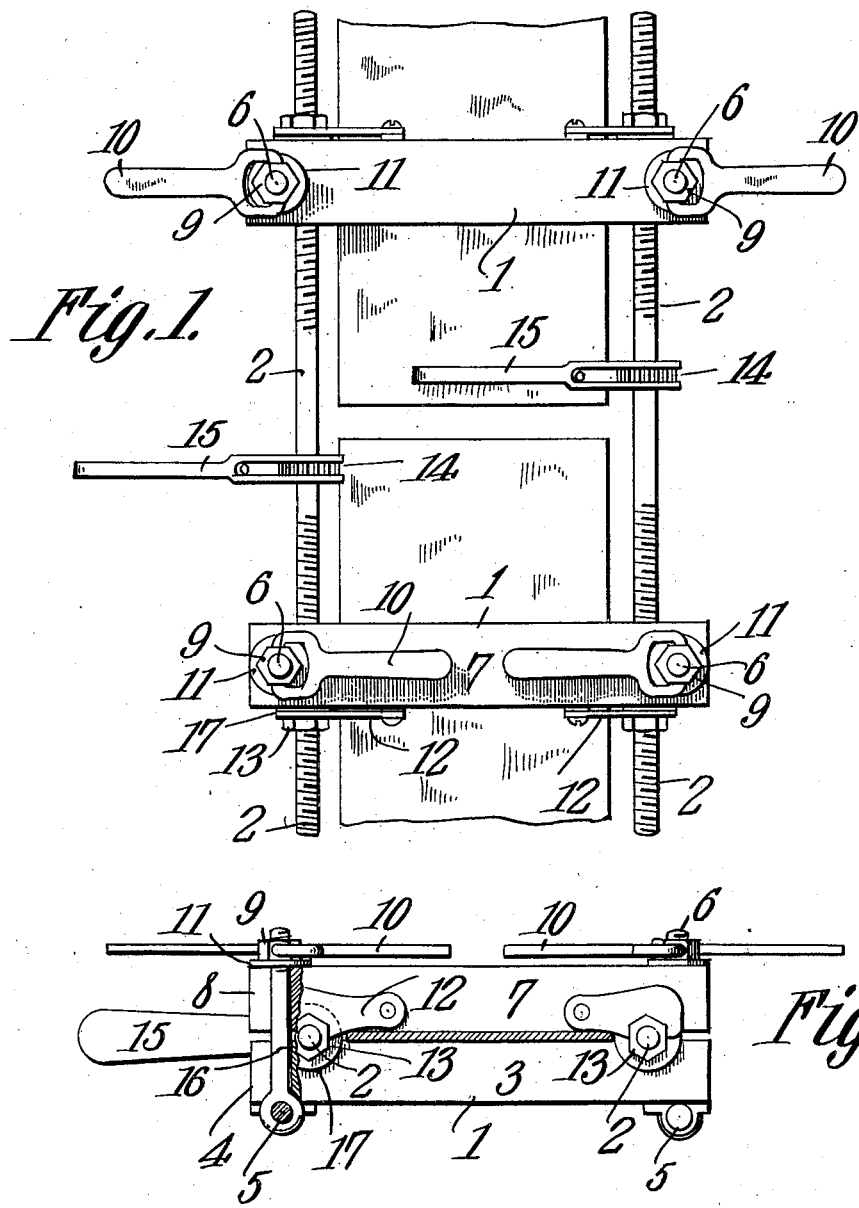
William Lozo,
Inventor

UNITED STATES PATENT OFFICE.

WILLIAM LOZO, OF WILKES-BARRE, PENNSYLVANIA.

BELT-STRETCHER.

No. 889,250.　　　　Specification of Letters Patent.　　　　Patented June 2, 1908.

Application filed October 14, 1907. Serial No. 397,420.

*To all whom it may concern:*

Be it known that I, WILLIAM LOZO, a citizen of the United States, residing at Wilkes-Barre, in the county of Luzerne and State of Pennsylvania, have invented a new and useful Belt-Stretcher, of which the following is a specification.

This invention has relation to belt stretchers and it consists in the novel construction and arrangement of its parts as hereinafter shown and described.

The object of the invention is to provide a belt stretcher consisting of a pair of belt clamps of like construction and a pair of right and left threaded rods for drawing the clamps together. Bolts are provided for connecting the members of each clamp together and the draft rods are so connected with the clamp as to relieve the above said bolts from the stress of the belt when the same is drawn taut.

In the accompanying drawing:—Figure 1 is a top plan view of the stretcher applied to the ends of a belt, and Fig. 2 is an end view of the stretcher.

The stretcher consists of a pair of clamps 1 and the draft rods 2. The clamps 1 are of like construction and each clamp consists of a member 3 having the recesses 4 at its ends. The pivots 5 are attached to the ends of the members 1 and straddle the recesses 4. Bolts 6 are provided with eyes which receive said pivot. The members 7 are provided at their ends with the recesses 8 which are adapted to register with the recesses 4 and when in register with the recesses 4 are adapted to receive the bolts 6. The free ends of the bolts are screw threaded and the nuts 9 are adapted to screw upon the free ends of the said bolts. The nuts 9 are provided with pivoted handles 10 which serve as wrenches. The washers 11 are interposed between the nuts 9 and the upper surfaces of the member 7. The hooks 12 are pivotally mounted upon the sides of the members 7. Said hooks are adapted to engage the nuts 13 upon the draft rods 2 and retain the same against rotation.

Each of the draft rods 2 is provided with a right and left thread and at an intermediate portion with a ratchet wheel 14. The ratchet wheel of one draft rod is out of alinement transversely with the ratchet wheel of the other draft rod. The pawl levers 15 are fulcrumed upon the draft rod and have their pawls to close to engage the ratchets of the wheels 14. The draft rods pass through grooves 16 provided in the adjacent surfaces of the members constituting the clamps and the washers 17 are interposed between the nuts 13 and the outer sides of the adjacent edges of the members 3 and 7.

In use, one end of the belt is secured between the members of one of the clamps 1 and the other end of the belt is secured between the members of the other clamp. The levers 15 are then swung so that the threaded portions of the draft rods 2, operating in the nuts 13, will draw the clamps 1 together. As the said levers are out of alinement with each other transversely across the surface both of the said levers may be conveniently operated at the same time as the movement of one does not interfere with the movement of the other. As the draft rods operate independent of each other one side or the other of the belt may be operated upon in stretching so as to cause the belt to meet squarely at its ends. Furthermore, by reason of the fact that the draft rods pass through grooves in the members of the clamps and are provided with washers which bear directly against the outer surfaces of the members of the clamps the bolts that hold the members of the clamps together are relieved of the stress of the belt when under tension.

In order to remove the stretcher from the belt the nuts 9 are given a few turns by swinging the handles 10 when the bolts 6 may be swung to one side and the member 7 lifted from the members 3. Thus the members of the clamps are separated and the stretcher is released of positive contact with the belt.

Having described my invention what I claim as new and desire to secure by Letters-Patent is:—

1. A belt stretcher comprising clamps of similar construction and draft rods of similar construction, each clamp consisting of members having recessed ends, pivots secured to the ends of one of the members and straddling the recesses thereof, bolts having eyes which receive said pivots, nuts with pivoted handles screw threaded upon said bolts, said members having grooves through which the draft rods pass, nuts screw threaded upon the draft rods, means for turning said rods, and hooks pivoted upon the clamps and adapted to engage the last said nuts.

2. A belt stretcher comprising clamps consisting of members adapted to grip the belt, draft rods passing through the clamp, nuts screw threaded upon the draft rods, hooks pivoted to the clamps and adapted to engage said nuts, ratchet wheels located upon the draft rods at intermediate points thereof and being out of alinement with each other transversely of the stretcher, and levers mounted upon the draft rod for engaging the ratchet wheels and operating the same.

In testimony that I claim the foregoing as my own, I have hereto affixed my signature in the presence of two witnesses.

WILLIAM LOZO.

Witnesses:
C. MORRIS ANGSTADT,
GEO. W. JONES.